United States Patent
Günthner et al.

(10) Patent No.: US 8,549,919 B2
(45) Date of Patent: Oct. 8, 2013

(54) MICROMECHANICAL ROTATION RATE SENSOR WITH A COUPLING BAR AND SUSPENSION SPRING ELEMENTS FOR QUADRATURE SUPPRESSION

(75) Inventors: Stefan Günthner, Frankfurt (DE); Bernhard Schmid, Friedberg (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 467 days.

(21) Appl. No.: 12/677,240

(22) PCT Filed: Aug. 18, 2008

(86) PCT No.: PCT/EP2008/060802
§ 371 (c)(1),
(2), (4) Date: Mar. 9, 2010

(87) PCT Pub. No.: WO2009/033915
PCT Pub. Date: Mar. 19, 2009

(65) Prior Publication Data
US 2010/0186507 A1  Jul. 29, 2010

(30) Foreign Application Priority Data

Sep. 10, 2007 (DE) .......... 10 2007 042 681
Nov. 27, 2007 (DE) .......... 10 2007 057 042

(51) Int. Cl.
*G01P 3/44* (2006.01)
(52) U.S. Cl.
USPC ....................................................... 73/504.14
(58) Field of Classification Search
USPC ....................................................... 73/504.14
See application file for complete search history.

(56) References Cited

U.S. PATENT DOCUMENTS 3,646,818 A * 3/1972 Little et al. ............ 73/514.16
5,728,936 A   3/1998 Lutz
(Continued)

FOREIGN PATENT DOCUMENTS

DE       19530007 C2    2/1997
DE     102007012163 A1  10/2007
(Continued)

OTHER PUBLICATIONS

Sharma et al., A High-Q-In-Plane SOI Tuning Fork Gyroscope, In: Sensors, 2004 Proceedings of IEEE Oct. 24-27, vol. 1, pp. 467-470.

*Primary Examiner* — Hezron E Williams
*Assistant Examiner* — Mark A Shabman
(74) *Attorney, Agent, or Firm* — RatnerPrestia (57) ABSTRACT

A micromechanical rotation rate sensor including at least one substrate, wherein the base surface of the substrate is oriented parallel to the x-y plane of a Cartesian coordinate system, at least two seismic masses and in each case at least one suspension spring element for suspending the seismic mass from the substrate, wherein the at least two seismic masses are coupled to one another by at least one coupling bar, and at least one of the suspension spring elements includes at least two bar sections, which, in the undeflected state, are oriented essentially parallel to one another or are at an angle of less than 45° with respect to one another, and one or more connecting sections, which connect the bar sections to one another, wherein the bar sections can be displaced relative to one another in their longitudinal direction.

24 Claims, 9 Drawing Sheets

(56) References Cited

U.S. PATENT DOCUMENTS

| | | | |
|---|---|---|---|
| 5,895,850 A * | 4/1999 | Buestgens | 73/504.12 |
| 5,952,572 A * | 9/1999 | Yamashita et al. | 73/504.04 |
| 6,230,563 B1 * | 5/2001 | Clark et al. | 73/504.04 |
| 6,250,157 B1 * | 6/2001 | Touge | 73/504.12 |
| 6,761,068 B1 * | 7/2004 | Schmid | 73/504.14 |
| 7,520,169 B2 * | 4/2009 | Schwarzelbach | 73/504.12 |
| 2002/0093067 A1 | 7/2002 | Knowles | |
| 2005/0072231 A1 | 4/2005 | Chojnacki et al. | |
| 2008/0229824 A1 * | 9/2008 | Higuchi et al. | 73/504.16 |
| 2008/0276706 A1 | 11/2008 | Hartmann et al. | |
| 2010/0037690 A1 | 2/2010 | G nthner et al. | |
| 2010/0154543 A1 * | 6/2010 | Diem | 73/504.14 |

FOREIGN PATENT DOCUMENTS

| | | |
|---|---|---|
| EP | 0539393 B1 | 12/1994 |
| WO | WO 96/39614 | 12/1996 |
| WO | WO2006/034706 A1 | 4/2006 |
| WO | WO2007/104742 A1 | 9/2007 |

* cited by examiner

MICROMECHANICAL ROTATION RATE SENSOR WITH A COUPLING BAR AND SUSPENSION SPRING ELEMENTS FOR QUADRATURE SUPPRESSION

CROSS REFERENCE TO RELATED APPLICATIONS

This application is the U.S. national phase application of PCT International Application No. PCT/EP2008/060802, filed Aug. 18, 2008, which claims priority to German Patent Application No. 10 2007 042 681.1, filed Sep. 10, 2007, and German Patent Application No. 10 2007 057 042.4, filed Nov. 27, 2007, the contents of such applications being incorporated by reference herein.

FIELD OF THE INVENTION

The invention relates to a rotation speed sensor, to a method for manufacturing a rotation rate sensor and to the use of the rotation rate sensor in motor vehicles.

BACKGROUND OF THE INVENTION

Rotation rate sensors are usually used to sense the angular speed of a system about at least one defined axis. An important field of application of rotation rate sensors is motor vehicle engineering, for example in vehicle movement dynamics control systems such as the electronic stability program (ESP) or what is referred to as a rollover detection means. Such safety-critical fields of use make special requirements of the rotation rate sensors in this context.

The document U.S. Pat. No. 6,230,563 B1, which is incorporated by reference, describes a z axis rotation rate sensor which can therefore sense a rotation rate about its z axis, wherein the base surface of its substrate is oriented parallel to the x-y plane (Cartesian coordinate system). This rotation rate sensor has two seismic masses which are coupled to one another by means of a coupling bar, wherein the coupling bar is suspended from a torsion spring on the substrate. The seismic masses are suspended directly from the substrate, wherein this suspension means is embodied in such a way that it has to ensure the deflection capability of the seismic masses both for the drive modes and for the reading modes of the rotation rate sensor, as a result of which undesired crosstalk between the two oscillation modes can occur, and this has an adverse effect on the measurement.

Document WO 2006/034706 A1, which is incorporated by reference, proposes suspending the seismic masses from a frame which is itself suspended from the substrate. As a result, degrees of freedom in the suspension can be restricted to the extent that, for example, the frame structure oscillates together with the seismic masses in the drive mode, but in the reading mode only the seismic masses oscillate, as a result of which crosstalk between the two oscillation modes can be largely avoided. However, the coupling of the seismic masses by means of the proposed coupling unit is sensitive to interference excitations oriented in the same direction in the measuring direction, such as, for example, tremors.

Micromechanical springs are known for suspending seismic masses in rotation rate sensors, which springs bring about deflections in the reading direction due simply to relatively small preparation inaccuracies which lead, in particular, to undesired edge angles of the respective structures, without a rotation rate being present in the drive mode. This generates interference signals which are possibly evaluated as rotation rate signal components and therefore falsify the rotation rate signal or cause a measuring error with respect to the rotation rate signal.

Such undesired edge angles or tilting of springs are process-induced and can be avoided only to a restricted degree. The interference signals described above, which do not arise due to a sensed rotation rate but rather due to incorrect deflections in the reading direction as a function of the deflection of the seismic mass and the springs thereof in the driving direction, are also referred to as quadrature signals or quadrature.

SUMMARY OF THE INVENTION

An object of the present invention is to propose a micromechanical rotation rate sensor which measures relatively precisely or free of fault and in doing so to avoid or reduce, in particular, parasitic modes and interference deflections of the seismic masses.

The invention relates to the idea, based on the prior art, in which a rotation rate sensor has at least two seismic masses which are coupled to one another by means of at least one coupling bar. In addition, the rotation rate sensor has at least one suspension spring element comprising at least two bar sections which, in the undeflected state, are oriented essentially parallel to one another or are at an angle of less than 45° with respect to one another, and one or more connecting sections, which connect the bar sections to one another, wherein the bar sections can be displaced relative to one another in their longitudinal direction.

The use of such a suspension spring element or of such a linear spring in a rotation rate sensor suppresses the quadrature and/or reduces the occurrence of quadrature signals.

The at least one coupling bar suppresses deflections, essentially in the same direction, of the masses which are coupled by means of the coupling bar, and the associated interference signals or interference signal components. The at least one coupling bar particularly preferably suppresses deflection in the same direction or parasitic modes of the drive mode and/or of the reading mode.

A suspension spring element which comprises at least two bar sections which, in the undeflected state, are oriented essentially parallel to one another or are at an angle of less than 45° with respect to one another, and one or more connecting sections, which connect the bar sections to one another, wherein the bar sections can be displaced relative to one another in their longitudinal direction, is preferably also referred to as a linear spring, wherein the latter particularly preferably have an adjustable, in particular linear, deflection behavior.

The linear spring has, compared to previously known micromechanical springs, the advantage that the deflection interval within which the spring has an essentially adjustable, in particular linear, deflection behavior, is relatively large, and that the spring has relatively small dimensions in this context. In addition, the linear spring has, compared to conventional springs, a significantly smaller interference behavior due to fabrication inaccuracies which could lead to tilting of the spring and therefore to an interference signal.

The micromechanical spring preferably has at least two bar sections which are arranged essentially directly opposite one another and are connected to one another by means of a connecting section.

A bar section differs from a connecting section in particular at least in that the bar section is significantly longer, particularly preferably at least twice as long, as the at least one adjoining connecting section, wherein these two sections can merge with one another in particular in the form of at least one rounded portion.

The bar sections of already known, meandering springs are essentially not displaced with respect to one another in their longitudinal direction in the course of a deflection. The deflection of meandering springs comprises essentially a longitudinal deflection along the entire length of the spring.

The term deflection is preferably understood to mean the deflection travel or the deflection distance. The deflection of the suspension spring element and/or of the linear spring occurs, in particular, essentially in the direction of its bar sections.

An essentially linear deflection behavior of a spring is preferably understood to be an essentially linear relationship between the deflection travel and restoring force, in particular an essentially constant spring stiffness.

The essentially linear spring and/or the linear spring are preferably a micromechanical spring according to aspects of the invention.

The bar sections and connecting sections are preferably each rigidly connected to one another.

The rotation rate sensor expediently has at least one drive device or a drive means for driving the seismic masses and one or more reading devices for directly or indirectly sensing the seismic masses.

The reading devices are preferably provided for sensing deflections of the seismic masses, and the seismic masses correspondingly each have at least one means for sensing deflections which is/are each assigned to at least one reading direction.

A seismic mass preferably comprises at least in certain cases one or more drive devices and/or at least in certain cases one or more reading devices and/or one or more additional micromechanical elements of the rotation rate sensor.

The coupling of the coupling bar can expediently be embodied with each part of a seismic mass.

A substrate is understood to be a base and/or support body and/or housing part of the rotation rate sensor which is preferably an essentially unstructured part of the wafer from which the rotation rate sensor is formed. The substrate is particularly preferably composed of crystalline or polycrystalline, in particular conductive, silicon or one or more layers of semiconductor material and/or metal or metals and/or electrically insulating layers.

A drive mode or primary mode is understood to be an eigenmode of a rotation rate sensor, preferably the natural oscillation, particularly preferably the oscillation at a resonant frequency, of the at least two seismic masses, in which the seismic masses of the rotation rate sensor oscillate in particular continuously. Quite particularly preferably the at least two seismic masses oscillate in the same direction with inverse orientation with respect to one another in the course of the drive mode.

A reading mode or secondary mode is understood to be an eigenmode which preferably occurs due to a rotation rate and the associated effect of the Coriolis force.

The rotation rate sensor is preferably manufactured by means of surface micromechanics. In this context, the structures are etched into a diaphragm material, in particular silicon, by particularly preferably anisotropic dry etching, essentially perpendicularly through the diaphragm. The plane of the diaphragm base surface extends essentially parallel to the substrate surface. Anchoring points, at which in turn either spring elements or immobile structures are attached, are produced at the points where the diaphragm is permanently connected to the substrate lying underneath. As a result, rigid bodies which are suspended from springs can be implemented in a freely oscillating fashion. The anchoring points are quite particularly preferably electrically insulated from one another by means of insulating layers, and contact can be made with them from the outside.

The substrate plane or the base surface of the substrate is preferably oriented in such a way that it is oriented parallel to the x-y plane of a Cartesian coordinate system. The z axis of this coordinate system runs perpendicularly to the plane of the substrate. The coordinate axes can, in particular, be displaced in parallel with respect to the formation and arrangement of components of the rotation rate sensor.

The at least one suspension spring element is preferably composed of monocrystalline silicon.

The rotation rate sensor preferably has one or more drive means of one or more seismic masses and at least one reading device, wherein the at least one drive means drives the at least two seismic masses in the y direction, and the rotation rate sensor is configured in such a way that it can sense rotation rates about the x axis and/or z axis.

A drive means is preferably understood to be a comb drive with two combs which engage one in the other and are essentially electrically insulated from one another, and one of which is connected to at least one seismic mass and the other to the substrate. By applying a differential voltage to these combs it is possible to move them with respect to one another. In particular the drive mode is generated by means of at least one drive means.

The read device is expediently composed of a device which has at least two electrodes or other electrical/electronic elements, the capacitance or changes in capacitance of which in the combination and/or their potential difference with respect to one another is measured. In particular, such a reading device has comb structures which engage one in the other and are essentially electrically insulated from one another, and one of which is attached to the base element, particularly preferably to one or more seismic masses, and/or to the coupling bar, and the other of which is attached to the substrate. Alternatively or additionally, a reading device has, in particular, an electrode pair which comprises, in particular, an electrode which is surrounded by a seismic mass and an electrode which is embodied and arranged essentially parallel thereto, in a cover module or encapsulation module.

The at least one drive means expediently drives the at least two base elements in the y direction, wherein the rotation rate sensor is configured in such a way that it can sense rotation rates about the x axis and/or z axis. These configurations are particularly favorable in terms of measuring technology since deflections of the seismic masses which result from the Coriolis force can be sensed. The Coriolis force acts perpendicularly with respect to the drive device and perpendicularly with respect to the rotational axis.

Each seismic mass is preferably assigned at least one reading device.

It is preferred that the reading devices or reading units are used as drive means or drive units, and the drive units are used as reading units, as a result of which it is possible, for example, to use them with interchanged driving modes and reading modes.

It is expedient that the coupling bar is suspended from at least one spring element, in particular from a bar spring element which is clamped in, in particular, on the substrate and forms therewith at least one anchoring point, wherein the spring element is embodied and clamped in or attached in such a way that it prevents translatory deflections of the coupling bar. The prevention of such translatory deflections restricts the degrees of freedom of the rotation rate sensor, and compromised superimposed oscillation states can be at least partially avoided or limited or reduced. The coupling bar is in particular suspended here essentially in the region of its center of gravity from the at least one spring element. The at least one spring element from which the coupling bar is suspended is particularly preferably a torsion spring which makes possible or permits rotational deflection of the coupling bar about the z axis and/or the x axis.

The center of gravity of the one or more coupling bars preferably coincides, in particular totally coincides, essentially with the center of gravity of the entire rotation rate sensor, in particular respectively related to the x-y plane.

The coupling bar is expediently coupled at each of its ends to one or more seismic masses and/or one or more reading devices and/or one or more drive means, directly or via at least one spring element or a spring system which comprises, in particular, torsion springs.

It is preferred that the seismic masses are each embodied and arranged symmetrically with respect to an x-y and/or x-z and/or y-z plane with respect to a Cartesian coordinate system with the respective center point and/or center of gravity as a respective origin of this coordinate system, and have a suspension means which is symmetrical with respect to the latter, in particular in terms of the suspension points, particularly preferably from the substrate, with, in particular, four suspension spring elements or a multiple thereof. As a result, incorrect deflections of the seismic masses, caused by fabrication inaccuracies or tilting, can be additionally avoided since said incorrect deflections are additionally very largely avoided or suppressed by such a symmetrical suspension.

At least one of the suspension spring elements expediently has an essentially adjustable, in particular linear, force deflection behavior, essentially in the direction of its bar sections and particularly preferably essentially in the driving direction or y direction of a seismic mass. This seismic mass is suspended here from this one or more suspension spring element, very particularly preferably four suspension spring elements with a linear force deflection behavior in the direction of its bar sections and in the output direction.

It is expedient that at least one of the suspension spring elements has a coupling region and/or a coupling element which comprises, in particular, an additional micromechanical spring element.

It is preferred that at least one of the suspension spring elements has fabrication parameters comprising at least the spatial dimensions and/or the material parameters of the bar sections and of the at least one connecting section and, in particular, of the coupling regions and/or of the coupling elements, have such values that the spring has in the direction of its bar sections an essentially adjustable, in particular linear, force deflection behavior, at least within a defined deflection interval.

At least one of the suspension spring elements is preferably embodied in such a way that the bar sections and the connecting section or sections of the spring are embodied and arranged in an essentially u shape, v shape or s shape in the undeflected state.

At least one of the suspension spring elements expediently has an essentially adjustable, in particular linear, force deflection behavior, in particular for compensating an undesired and/or nonlinear deflection behavior of the other suspension spring elements, which deflection behavior is determined at least by the embodiment of the bar sections with defined lengths and widths and by an arrangement of the at least two bar sections with a defined distance from one another.

It is preferred that the crystal structure of the material of at least one of the suspension spring elements is oriented in such a way that the normal of the crystal lattice plane is oriented essentially 45° with respect to the normal of the substrate from which the spring is fabricated. This corresponds, in particular, to Miller indexes of <1,1,0>.

At least one of the suspension spring elements is preferably embodied in such a way that the absolute value of the nonlinearity coefficient of the second order of its spring stiffness with respect to a deflection essentially in the direction of its bar sections is less than 2 000 000 1/m$^2$, in particular less than 300 000 1/m$^2$.

The nonlinearity coefficient of the second order of the spring stiffness, also referred to simply as the nonlinearity coefficient, is understood to be preferably the parameter or factor $\beta$ [1/m$^2$] in the following equation of the standardized spring stiffness as a function of the deflection $x_0$:

$\hat{k}(x_0)=(1+\alpha x_0+\beta x_0^2)$, where the following relationships apply:

$k(x_0)=k_0(1+\alpha x_0+\beta x_0^2)$, $\hat{k}(x_0)=k(x_0)/k_0$.

The spring stiffness is expediently equal here to the quotient of the restoring force or the deflection force divided by the deflection travel.

It is expedient that at least one of the suspension spring elements is embodied and has such a force deflection behavior that this suspension spring element compensates a nonlinear force deflection behavior of a seismic mass in the driving direction, caused by the undesired force deflection behavior of one or more other suspension spring elements, and this seismic mass has overall an essentially linear force deflection behavior in the driving direction, in particular owing to this at least one suspension spring element with a force deflection behavior which has been set in a defined fashion.

At least one of the suspension spring elements is preferably embodied as a linear spring. All the suspension spring elements of a seismic mass are particularly preferably embodied as linear springs.

At least one of the suspension spring elements preferably has a negative nonlinearity coefficient of the second order of the spring stiffness with respect to a deflection of the spring element essentially in the direction of its bar sections, which corresponds, in particular, to softening of the spring stiffness as the deflection increases. This is advantageous, in particular for compensation purposes, in comparison with conventional spring elements which have increasing hardness as the deflection increases.

The rotation rate sensor is preferably embodied as an x axis sensor and can therefore sense a rotation rate about the x axis, wherein the seismic masses are driven in the y direction, wherein the seismic masses are suspended from suspension spring elements or spring elements, one of which is of rigid design in the x direction in each case, wherein the coupling bar is suspended from the substrate by means of a torsion spring, which permits torsion about the x axis and is rigid in the x and z directions, and, said coupling bar is coupled at each of its two ends to the seismic masses by means of spring elements.

The rotation rate sensor is preferably an x-z axis sensor which can accordingly sense rotation rates about the x and z axes, the base elements being driven in the y direction, wherein the coupling bar is suspended from the substrate by means of a torsion spring which permits torsion about the x axis and the z axis and is rigid in the x direction and z direction.

The rotation rate sensor is preferably embodied as a micro-electro-mechanical system (MEMS) or MEMS module which has, in particular, mechanical and electronic means for connecting to and/or interacting with further MEMS modules and/or with at least one, in particular integrated, electronic signal processing circuit.

The invention additionally relates to a method for manufacturing a rotation rate sensor, wherein micromechanical elements are formed by means of a manufacturing process for manufacturing micromechanical systems from a substrate which is composed, in particular, from crystalline silicon or one or more layers of semiconductor material and/or metal or metals, wherein, at least in parts, a rotation rate sensor described above is embodied, particularly preferably in accordance with one of the exemplary embodiments.

The rotation rate sensor according to aspects of the invention is provided for use in motor vehicles, in particular in a motor vehicle control system.

The rotation rate sensor described above can be used in different regions for sensing one or more rotation rates and/or for sensing one or more rotation accelerations by means of corresponding signal processing. In this context, the use in vehicles and in automation equipment is preferred, in particular in motor vehicles and aircraft, particularly preferably in the respective corresponding control systems. The use of the rotation rate sensor as a yaw rate sensor and/or yaw acceleration sensor in a motor vehicle control system, for example ESP, is very particularly preferred.

BRIEF DESCRIPTION OF THE DRAWINGS

The invention is best understood from the following detailed description when read in connection with the accompanying drawings. Included in the drawings is the following Figures.

DETAILED DESCRIPTION OF THE PREFERRED EMBODIMENTS

Figure 1:
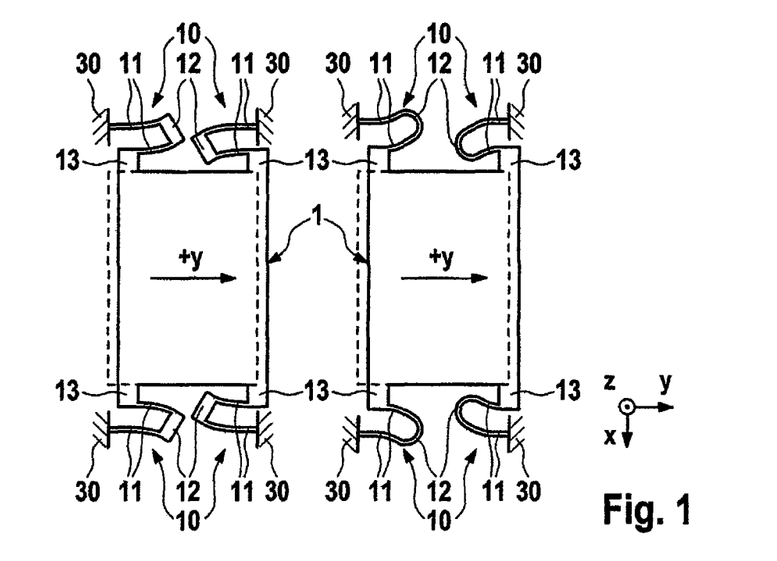
FIG. 1 shows two exemplary embodiments for suspending a seismic mass with linear springs.

FIG. 1 shows two exemplary embodiments for suspending a seismic mass 1 from the substrate 30 by means of four exemplary proposed suspension spring elements or linear springs 10. The latter prevent quadrature signals occurring due to possible tilting of the spring cross sections as a result of fabrication inaccuracies. The two illustrated exemplary embodiments of the suspension spring elements or linear springs 10 each comprise here two bar sections 11, a connection section 12 and a coupling region 13, which connects one of the bar sections to the seismic mass 1. The oscillators illustrated in FIG. 1 are each deflected in the y direction, as is indicated by the dashed line. The suspension spring elements 10 are correspondingly likewise depicted deflected in the y direction.

Figure 2:
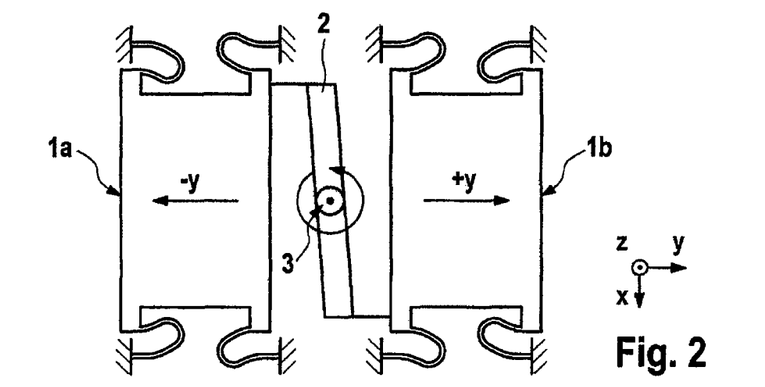
FIG. 2 shows an exemplary embodiment with two seismic masses which are coupled to one another by means of a coupling bar and as a result can carry out opposing deflections.

FIG. 2 illustrates the coupling of two seismic masses 1a, 1b by means of a coupling bar 2. The rotational suspension means 3 of the coupling bar permits rotation about the z axis, perpendicular to the plane of the substrate, likewise perpendicular to the driving direction y, wherein the suspension of the coupling bar 2 is of predominantly stiff design in the plane of the substrate of the seismic masses. The seismic masses 1a and 1b are each suspended stiffly in the direction of their driving movement y at the ends of the coupling bar 2.

Figure 3:
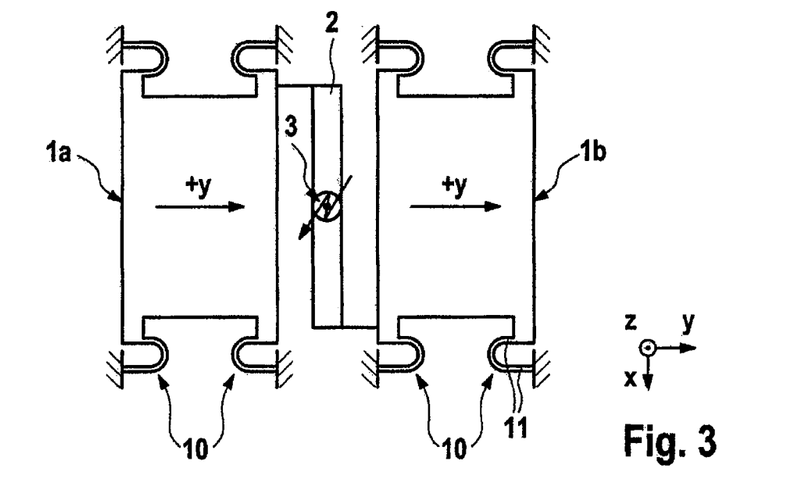
FIG. 3 shows the exemplary suppression of translatory movements of the seismic masses in the same direction.

When the seismic masses 1a, 1b move apart from one another or toward one another when suspended from linear springs 10, the coupling bar 2 also rotates. Attempts to move seismic masses 1a, 1b with the same orientation in the y direction, the coupling bar 2 suppresses this movement (as illustrated by the exemplary embodiment in FIG. 3) by virtue of the rotational suspension 3 of said coupling bar 2, which suspension 3 is of stiff design in the y direction. Furthermore, FIG. 3 shows exemplary linear springs 10 in the undeflected state, wherein bar sections 11 are each oriented essentially parallel to one another.

Figure 4:
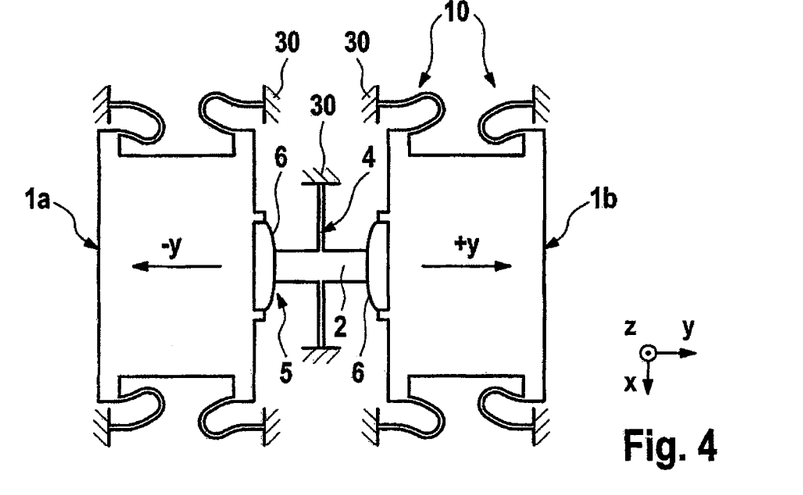
FIG. 4 shows an exemplary embodiment of a rotation rate sensor with a rotational axis of the coupling bar parallel to the x axis.
Figure 5:
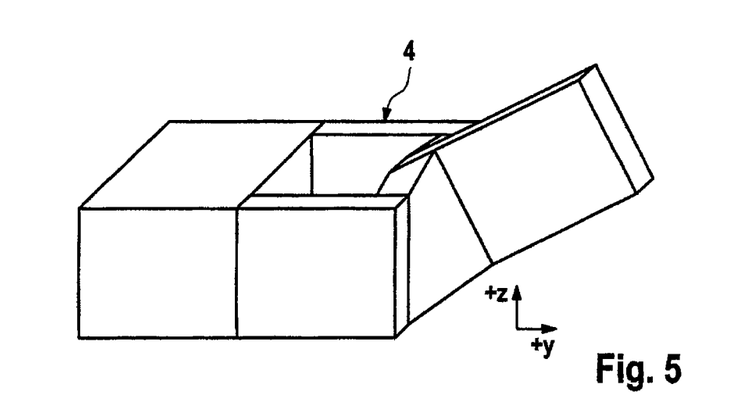
FIGS. 5 to 7 show the connection and method of operation of an exemplary coupling bar in the case of deflections of the seismic masses in the z direction.

FIG. 4 shows an exemplary rotation rate sensor with a coupling bar 2 which can rotate about an axis which is parallel to the x axis. The connection to seismic masses 1a, 1b is provided by means of a torsion spring 4 (additionally illustrated in FIG. 5) which permits deflections (illustrated by way of example in FIG. 6) of the seismic masses in the z direction. The spring system 5 itself, by means of which the coupling bar 2 is connected to the respective seismic mass 1a, 1b, ensures a rigid coupling of the respective seismic mass in the z direction and of the corresponding end of the coupling bar. The properties of the spring elements 6 of the spring system 5 are set, for example by setting the ratio of its respective width to the height. If the respective spring element 6 has a substantially larger extent in the z direction than in the y direction, it is stiff in the z direction but soft with respect to torsion about its longitudinal axis and with respect to deflections in the y direction. Seismic masses 1a and 1b are suspended from the substrate 30 for example by means of four suspension spring elements 10 in each case, wherein suspension spring elements 10 have symmetrical suspension point on seismic masses 1a, 1b and their deflecting orientation in the y direction in relation to the two seismic masses are inverted with respect to one another.

Figures 6, 7:
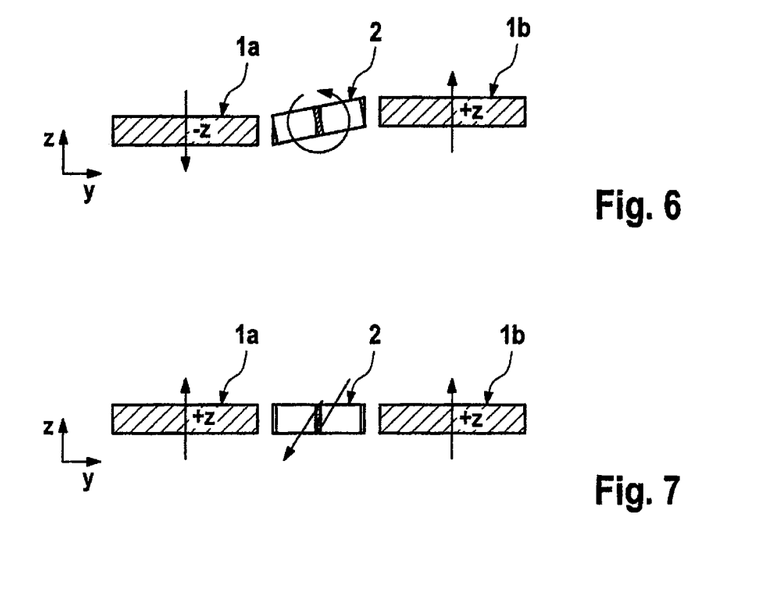

Deflection of the seismic masses in the same direction, in the z direction, is suppressed as illustrated in FIG. 7.

The coupling bar 2 is, as illustrated in FIG. 4, suspended by means of a torsion spring 4 which is attached to the substrate 30 and which is embodied as a bar spring and essentially only permits torsion about the x axis and is stiff in the z direction. This too can be set in the case of a bar spring by adapting the ratio of width to height. Deflection of seismic masses, coupled in this way, in the same direction, in the z direction, is therefore suppressed by the rigid coupling bar and the torsion spring suspension means. It is to be noted here that the lever distance from the fulcrum of the coupling bar and the seismic masses 1a, 1b is identical on each side.

Figure 8:
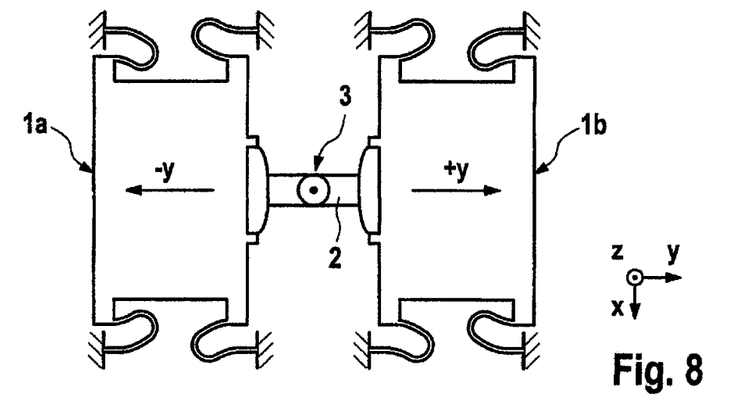
FIGS. 8 to 10 show an exemplary embodiment of a z axis rotation rate sensor and the degrees of freedom thereof.
Figure 9:
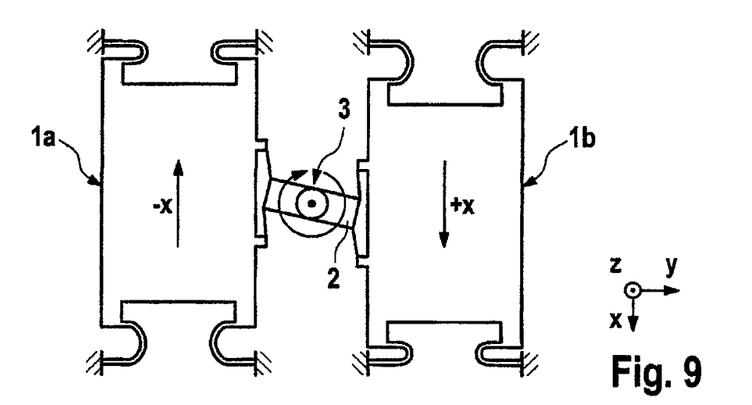
Figure 10:
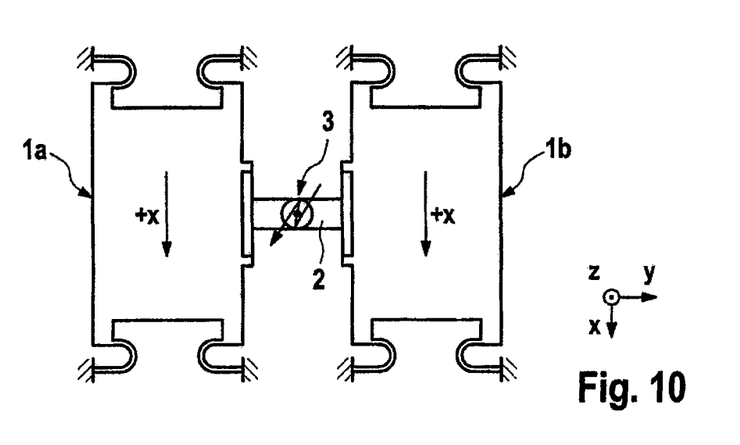

FIGS. 8, 9 and 10 illustrate an exemplary z axis rotation rate sensor in which the rotational axis of the coupling bar 2 is a line parallel to the z axis. Here, FIG. 8 shows the plan view of the exemplary embodiment, while FIG. 9 shows opposing deflections of seismic masses 1a, 1b, and FIG. 10 shows the prevention of deflections of seismic masses 1a, 1b with the same direction or orientation, in the x direction, which are prevented by the coupling bar 2 and the suspension means 3 thereof. Here, for example the lever distance from the fulcrum or from the suspension means 3 of the coupling bar 2 to seismic masses 1a, 1b is identical in each case. The connection of the seismic masses 1a, 1b to the coupling bar 2 is provided by means of a spring arrangement 5 which links the x position of the respective seismic mass to the corresponding end of the bar. This spring arrangement 5 is embodied here in such a way that it influences the direction of movement or the deflection of the seismic masses as little as possible.

Figure 11:
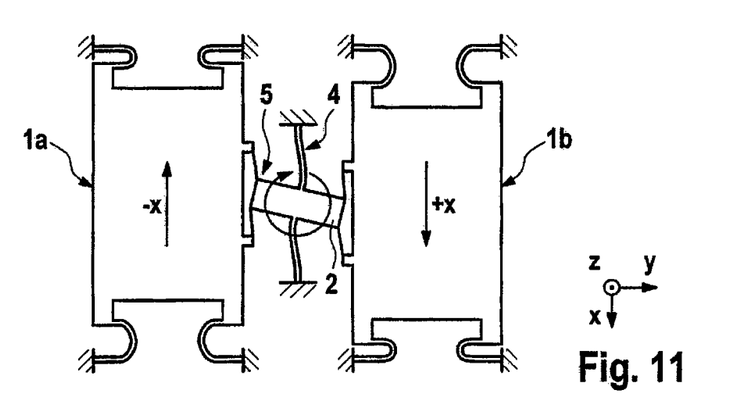
FIG. 11 shows an exemplary x-z rotation rate sensor.

FIG. 11 shows an exemplary x-z rotation rate sensor, the coupling bar 2 of which is suspended from the torsion spring 4 in such a way that it can be deflected rotationally about both its x axis and its z axis. As a result, seismic masses 1a, 1b can be deflected in anti-phase both in the z direction and in the x direction. Deflections of the seismic masses which are directed or oriented in the same direction are suppressed here. For example, the connection of the coupling bar 2 to seismic masses 1a, 1b takes place by means of a spring system 5 which connects the seismic masses rigidly to the corresponding end of the coupling bar 2 both in the x and z directions, as described above by way of example.

Figure 12:
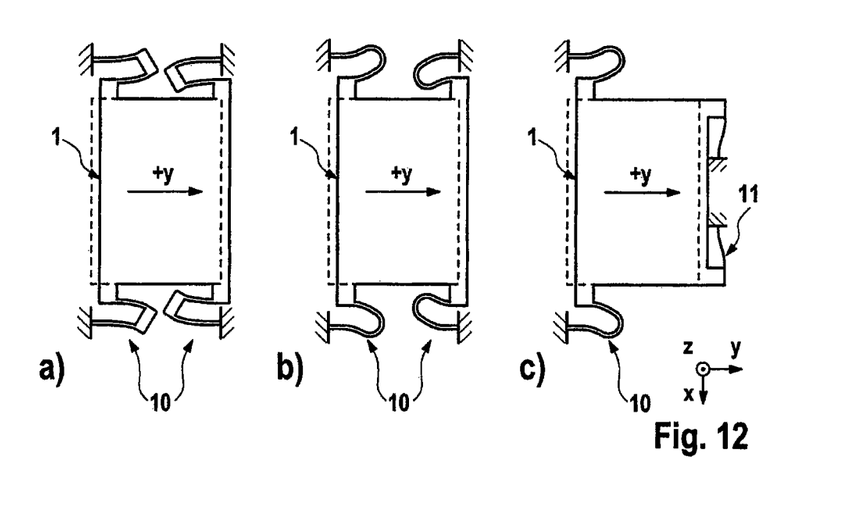
FIG. 12 shows exemplary embodiments for suspending a seismic mass.

FIG. 12 illustrates exemplary embodiments of the suspension of a seismic mass 1 with suspension spring elements 10. The latter are embodied and arranged symmetrically and as linear springs here in FIGS. 12a) and b). The exemplary embodiment illustrated in FIG. 12c) suppresses deflections of the seismic mass in the x direction through the suspension of the seismic masses from two additional bar springs 11 which are of stiff design in the x direction.

Exemplary methods for the implementation and/or development of linear springs and for the development of suspension spring elements with adjustable steering behavior will be described below:

Methods by Means of Finite Elements:

The method of the finite elements provides the possibility of describing in a computer-supported fashion spring properties of a bar arrangement composed of a specific material whose elastic properties are known. It is possible, for example, to operate the spring stiffnesses in all spatial directions or about all spatial axes. For this purpose, the position of the spring, which corresponds to an end of the spring which is assumed to be secured or clamped in, is provided with a corresponding edge condition, and the position which corresponds to an end which is assumed to be free or deflectable is deflected by way of example by a specific absolute value in a spatial direction or about a spatial axis. The stiffness of the spring can be calculated from the result of the analysis, for example by determining the reaction force acting on the deflection travel. In order to determine the spring stiffness, other known methods can also be used, for example the effect of a force on the free end or of an acceleration on a suspended mass. In addition, for example nonlinear material properties and geometrical nonlinearities can be represented completely in the finite element analysis. As a result, given suitable dimensions of a material arrangement, the deflection-dependent spring stiffness and therefore the linearity behavior can be determined. A method with which the desired deflection behavior can be obtained or set will be described below.

Firstly, one or more specific embodiments of a spring are selected, and the following investigations are carried out for each individual spring. After the analysis of the individual investigations, the optimum spring design can be decided on.

For a spring embodiment, the dimensions which can be varied are then selected. If n free geometry parameters $\xi_i$ (i= 1 ... n), which are represented by the vector $\bar{\xi}=(\xi_1, \xi_2, \ldots \xi_n)$, are available, an n-dimensional parameter field is therefore created. Specific restrictions intended for the parameters $\xi_i$ typically apply to the values which they can assume. They can also lie approximately within an interval with the limiting values $a_{\xi i}$ and $b_{\xi i}$:

$\xi_i \in [a_{\xi i}; b_{\xi i}]$.

Finally, a number of $m_i$ values, lying within the range $[a_{\xi i}; b_{\xi i}]$ are selected for each geometry parameter $\xi_i$: $\xi_{i,1}$ $\xi_{i,2}, \ldots \xi_{i,m_i}$. This results in a set of $$\prod_{i=1}^{n} m_i$$

of different parameter vectors $(\xi_{i,j_1}, \xi_{2,j_2}, \ldots \xi_{n,j_n})$ where $j_i \in [1, 2, \ldots m_i]$ are obtained. For each possible combination of $(j_i, j_2, \ldots j_n)$ there is an associated parameter set $(\xi_{i,j_1}, \xi_{i,j_2}, \ldots \xi_{i,j_n})$, to which a specific geometry dimensioning corresponds. For each individual geometry dimensioning it is then possible to carry out the desired simulations. In order to determine the deflection behavior, for example at least three simulations are necessary for this, in which simulations the free end is shifted by at least three different values $x_1, x_2, \ldots x_p$ ($p \geq 3$) in the desired deflection direction. This results in at least three reaction forces acting on the deflected free end in the opposite direction to the deflection direction: $F(x_1), F(x_2), \ldots F(x_p)$.

The spring stiffnesses $K(x_q)=F(x_q)/x_q$ can be calculated therefrom as $q \in [1, 2, \ldots p]$. It is then possible to determine the parameters $k_0$, a and $\beta$ of the function $k(x_0)=k_0(1+ax_0+\beta x^2_0)$ in such a way that the spring constants $K(x_q)$ are approximated by $k(x_q)$, for example according to the principle of the least mean square error. For each parameter set $(\xi_{1,j_1}, \xi_{2,j_2}, \ldots \xi_{n,j_n})$ the linear spring constant $k_0$ and the nonlinearity coefficient $\beta$ are therefore obtained.

If the nonlinearity coefficients $\beta$ have therefore been determined for all the parameter sets of all the spring designs, the parameter sets and/or spring designs which have the desired properties in terms of the stiffness and the nonlinearity coefficient $\beta$ etc. can be selected.

Methods of Analytical Modeling:

If a limitation to simple bar geometries is adopted, an analytical model according to the bar theory can be designed which describes the desired properties. The nonlinearity coefficient can be set by parameter optimization of the geometric dimensions within the analytical model.

Experimental Selection:

A further possibility is the experimental investigation of variants of selected spring concepts. For example, it is possible to investigate oscillators with masses which are suspended from the spring elements to be investigated. This allows conclusions to be drawn about the nonlinearity coefficient. However, only relatively small dimensioning can be analyzed owing to the expenditure on production and measurement.

An exemplary micromechanical linear spring will be described in more detail below and contrasted with a conventional micromechanical, linearity-optimized, meandering spring. Peripheral conditions are:

(A) the structure height h is 100 μm.
(B) the material used is monocrystalline silicon, with the coordinate system which is provided by the crystal directions is rotated through 45 degrees about the normal of the wafer with respect to the coordinate system of the element.
(C) the spring stiffness in the deflection direction is to be 400 $Nm^{-1}$. If a mass of 2 μg is held by two springs, a natural frequency in the deflection direction of 20 kHz occurs.

Figure 13:
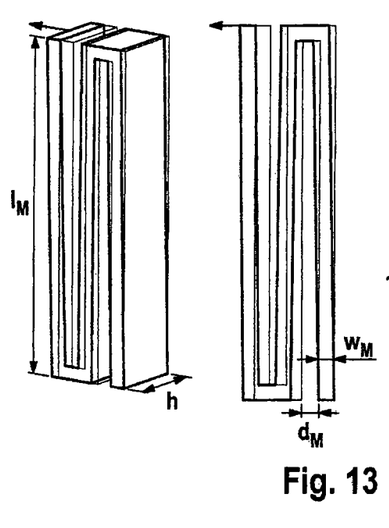
FIG. 13 shows an exemplary meandering spring.

A conventional meandering spring having the dimensions $l_M$=436 μm, $w_M$=18 μm and $d_M$=20 μm has a stiffness of 400 $Nm^{-1}$. The silicon surface which is covered by the meandering structure is 0.024 $mm^2$ here. FIG. 13 shows these exemplary meandering springs.

Figure 14:
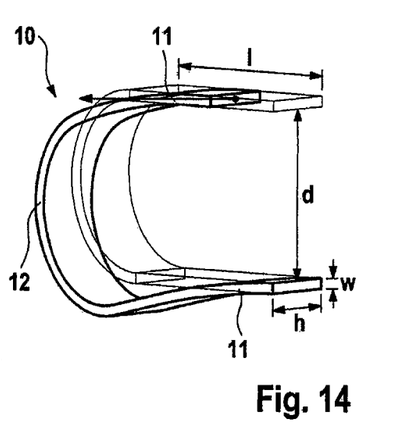
FIG. 14 shows an exemplary embodiment of a linear spring.

FIG. 14 shows, for comparison, an exemplary suspension spring element 10, embodied as a linear spring 10, with the dimensions l=250 μm, which corresponds essentially to the length of the two bar sections 11, the width w=15.3 μm and a distance d=250 μm of the two bar sections 11 of the micromechanical spring, wherein this linear spring 10 also has a stiffness of 400 $Nm^{-1}$. By means of the method of finite elements which is described above, the dimensions were selected, and such dimensions or embodiment parameters were determined that the nonlinearity coefficient β is very small in relation to the meandering spring in FIG. 13. The silicon surface which is occupied by the spring structure of the linear spring 10 is only 0.014 $mm^2$.

Figure 15:
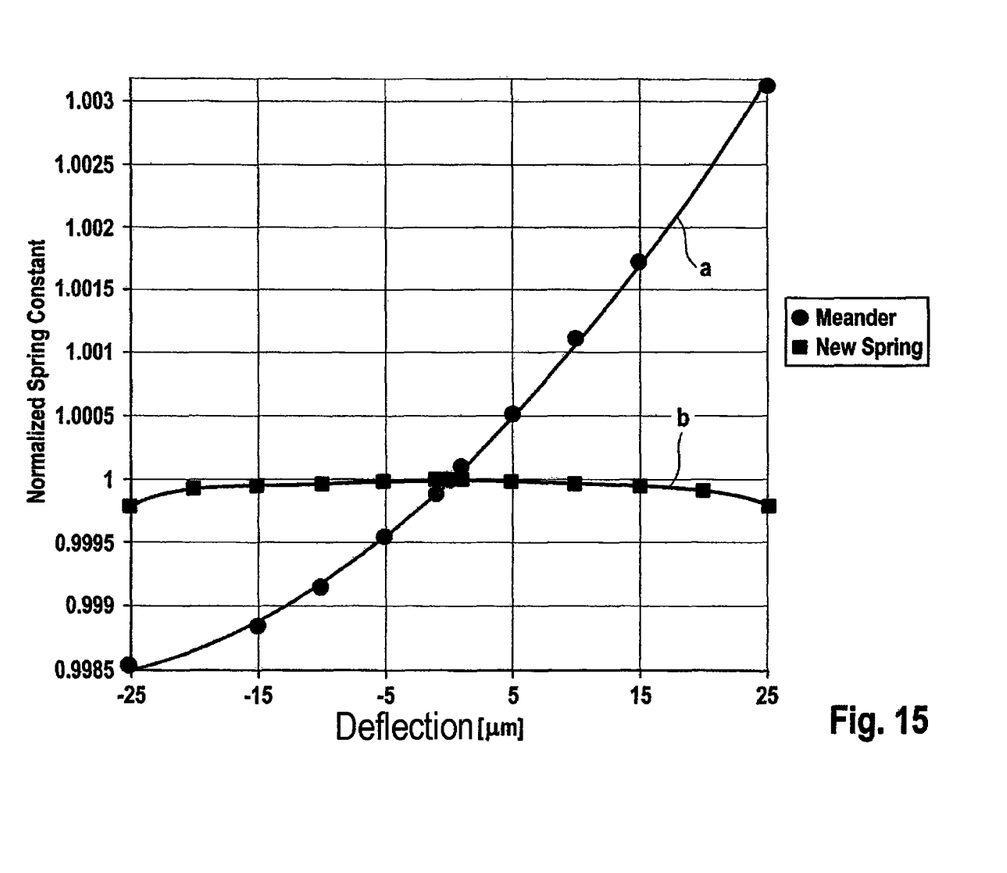
FIG. 15 shows the comparable profiles of the standardized spring stiffnesses as a function of the deflection of these two exemplary embodiments.

The different linearity behavior of these two different springs in FIGS. 13 and 14 is illustrated in FIG. 15. Here, the standardized spring constant $\hat{k}(x_0)$ in the deflection direction is plotted against the deflection. While the meandering spring in the illustrated deflection region has a nonlinearity coefficient of $1.3 \cdot 10^6$ as illustrated in curve a, the nonlinearity coefficient of the new spring structure is smaller in absolute value than 300 000 $1/m^2$, as illustrated in curve b. In particular, in the illustrated new spring structure, the nonlinearity coefficient is negative, with the result that spring-stiffening nonlinearities which occur as a result of additional effects could be compensated. An oscillator with the meandering structure can be operated only up to approximately 9 μm amplitude without instability regions, and with the novel spring structure stable oscillations up to amplitudes of 23 μm are possible. In addition, the area on the meandering structure which is covered by the spring arrangement is considerably larger.

Figure 16:
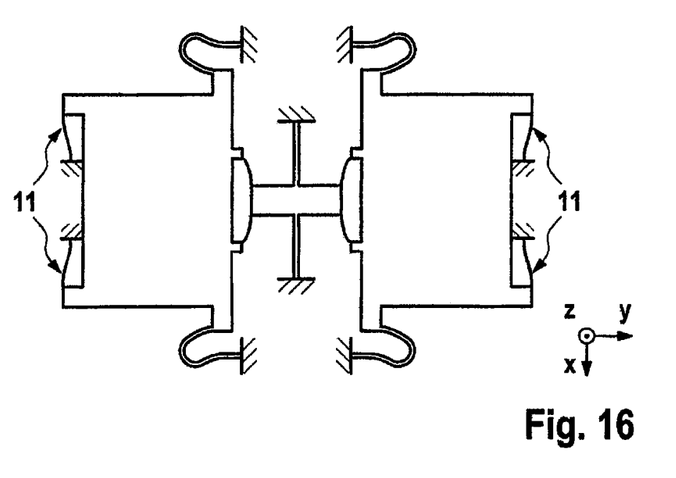
FIG. 16 shows an exemplary x axis rotation rate sensor.

FIG. 16 illustrates an exemplary x axis rotation rate sensor which has additional springs 11 which are of stiff design in the x direction and prevent undesired deflections in this direction; however, said springs 11 do not influence the driving mode in the y direction and the reading mode in the z direction and are correspondingly of soft design in the y and z directions.

Figure 17:
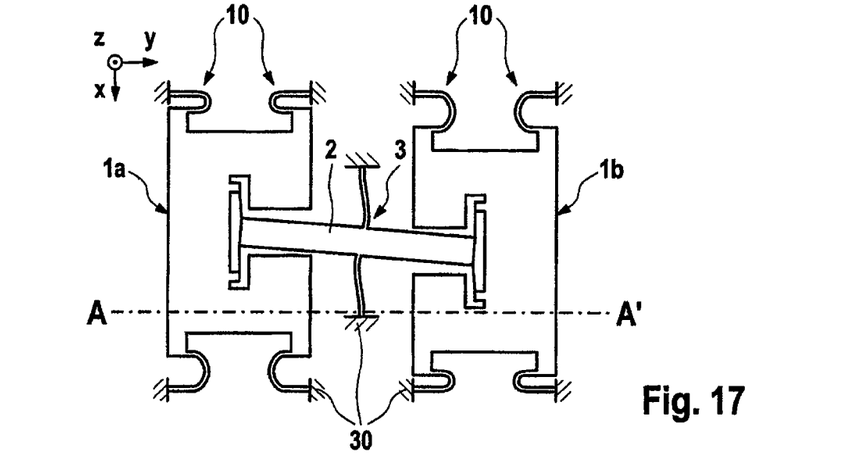
FIG. 17 shows an exemplary embodiment of an x-z axis rotation rate sensor, the seismic masses of which are connected centrally to the coupling bar.

FIG. 17 shows an exemplary z axis rotation rate sensor, the seismic masses 1a, 1b of which are coupled essentially by their center to the coupling bar 2. The seismic masses may oscillate or be deflected in antiphase both in the x direction and in the z direction. This rotation rate sensor is therefore suitable for sensing rotation rates about the x axis and/or the z axis. The torsion spring 3, by means of which the coupling bar 2 is suspended from the substrate 30, is embodied in such a way that it is of stiff design with respect to translatory deflections in the z direction and x direction, and permits rotational deflections or torsional deflections about the x axis and the z axis. Seismic masses 1a and 1b are each suspended from the substrate 30 by means of symmetrically arranged linear springs 10 for the purpose of quadrature suppression. FIG. 17 shows an exemplary anti-phase deflection of seismic masses 1a, 1b in the x direction, on the basis of a driving mode in the y direction and a sensed rotation rate about the z axis.

Figure 18:
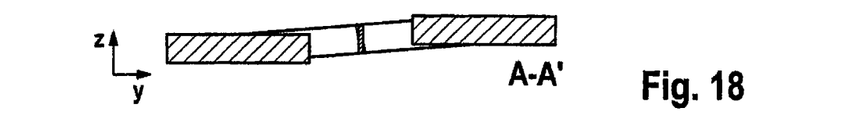
FIG. 18 shows the exemplary reading mode in the z direction of this rotation rate sensor in section.

FIG. 18 shows, in accordance with the section A-A' of the exemplary rotation rate sensor in FIG. 17, the reading mode in the z direction on the basis of an additionally sensed rotation rate about the x axis.

Figure 19:
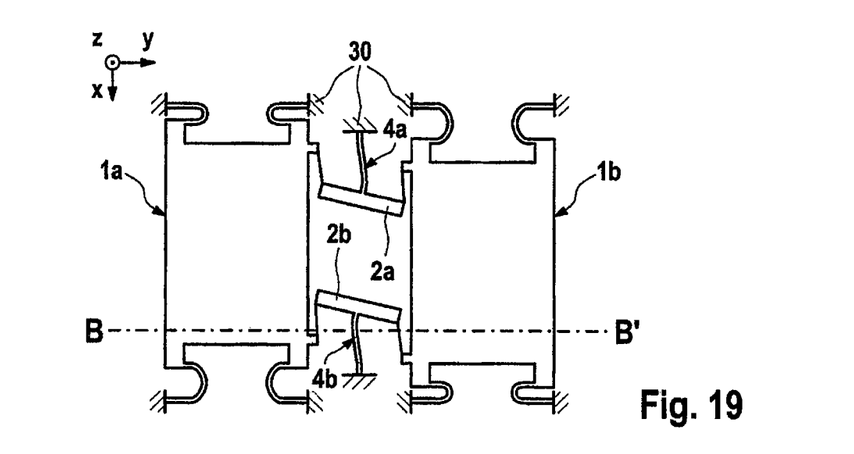
FIG. 19 shows an exemplary embodiment of an x-z axis rotation rate sensor with two coupling bars.
Figure 20:
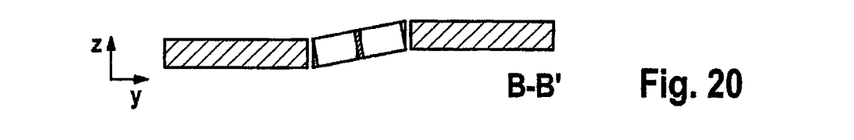
FIG. 20 shows a section illustrating the reading mode of said rotation rate sensor in the z direction.

FIG. 19 shows an exemplary x-z axis rotation rate sensor with two coupling bars 2a, 2b which each couple seismic masses 1a and 1b to one another as well as exemplary reading modes thereof as an x axis sensor and as a z axis sensor in FIG. 20. The seismic masses 1a and 1b are driven in the y direction. The coupling bars 2a and 2b are each suspended from the substrate 30, or clamped into the substrate 30, in the region of their center of gravity by means of a torsion spring 4a or 4b, respectively. The torsion springs 4a and 4b are embodied here in such a way that they suppress translatory deflections at least in the x and y directions, or are of rigid design in these directions and permit rotational deflections or torsional deflections about the x axis and the z axis.

In the exemplary embodiments of the rotation rate sensors which are described above, it is possible to use the reading units (not illustrated) as drive units and the drive units (not illustrated) as reading units, as a result of which it is possible, for example to use said rotation rate sensors with interchanged driving and reading modes (not illustrated).

In the case of an x-z axis rotation rate sensor, it is possible, for example in the embodiments shown above, to use said sensor as an x rotation rate sensor, as a z rotation rate sensor or as an x-z rotation rate sensor.

The invention claimed is:

1. A micromechanical rotation rate sensor comprising:
   at least one substrate, wherein a base surface of the substrate is oriented parallel to an x-y plane of a Cartesian coordinate system; and
   at least two seismic masses and, in each case, at least one suspension spring element for suspending the seismic mass from the substrate;
   at least one coupling bar for coupling the at least two seismic masses to one another;
   wherein at least one of the suspension spring elements comprises at least two bar sections, which, in an undeflected state, are oriented substantially parallel to one another or are oriented at an angle of less than 45° with respect to one another, and one or more connecting sections, which connect the bar sections to one another;
   wherein the bar sections can be displaced relative to one another in their longitudinal direction,
   wherein at least one of the suspension spring elements has a negative nonlinearity coefficient of a second order of spring stiffness.

2. The rotation rate sensor as claimed in claim 1, wherein the rotation rate sensor has one or more drive means for driving one or more seismic masses and at least one reading device, wherein the at least one drive means drives the at least two seismic masses in a y direction, and the rotation rate sensor is configured to sense rotation rates about an x axis and/or z axis.

3. The rotation rate sensor as claimed in claim 1, wherein the coupling bar is suspended from at least one spring element which is clamped on the substrate and forms therewith at least one anchoring point, wherein the spring element is embodied and clamped in or attached in such a way that the spring element prevents translatory deflections of the coupling bar.

4. The rotation rate sensor as claimed in claim 3, wherein the coupling bar is suspended substantially in a region of its center of gravity from the at least one spring element.

5. The rotation rate sensor as claimed in claim 4, wherein the at least one spring element from which the coupling bar is suspended is a torsion spring which permits rotational deflection of the coupling bar about a z axis and/or an x axis.

6. The rotation rate sensor as claimed in claim 4, wherein the center of gravity of the one or more coupling bars coincides substantially with a center of gravity of the rotation rate sensor.

7. The rotation rate sensor as claimed in claim 4, wherein the center of gravity of the one or more coupling bars coincides substantially with a center of gravity of the rotation rate sensor in an x-y plane.

8. The rotation rate sensor as claimed in claim 1, wherein the coupling bar is coupled at each of its ends to one or more seismic masses and/or one or more reading devices and/or one or more drive means, either directly or via at least one spring element.

9. The rotation rate sensor as claimed in claim 1, wherein the seismic masses are each embodied and arranged symmetrically with respect to an x-y plane and/or x-z plane and/or y-z plane with respect to a Cartesian coordinate system with the respective center point and/or center of gravity as a respective origin of the Cartesian coordinate system, and the seismic masses have a suspension means which is symmetrical with respect to said center of gravity.

10. The rotation rate sensor as claimed in claim 9, wherein the suspension means comprises four suspension spring elements.

11. The rotation rate sensor as claimed in claim 1, wherein at least one of the suspension spring elements has a substantially adjustable, linear, force deflection behavior in a direction of its bar sections.

12. The rotation rate sensor as claimed in claim 1, wherein at least one of the suspension spring elements has a coupling region and/or a coupling element which comprises an additional micromechanical spring element.

13. The rotation rate sensor as claimed in claim 12, wherein at least one of the suspension spring elements has fabrication parameters comprising at least spatial dimensions having values such that the spring has in the direction of its bar sections a substantially adjustable, linear, force deflection behavior, at least within a defined deflection interval.

14. The rotation rate sensor as claimed in claim 12, wherein material parameters of the bar sections and of the at least one connecting section and of the coupling regions and/or of the coupling elements, have values such that the spring has in the direction of its bar sections a substantially adjustable, linear, force deflection behavior, at least within a defined deflection interval.

15. The rotation rate sensor as claimed in claim 1, wherein at least one of the suspension spring elements is embodied in such a way that the bar sections and the connecting section or sections of the spring are embodied and arranged in a substantially u-shape, v-shape or s-shape in the undeflected state.

16. The rotation rate sensor as claimed in claim 1, wherein at least one of the suspension spring elements has a substantially adjustable, linear, force deflection behavior which is determined at least by an embodiment of the bar sections with defined lengths and widths and by an arrangement of the at least two bar sections at a defined distance from one another.

17. The rotation rate sensor as claimed in claim 1, wherein a crystal structure of a material of at least one of the suspension spring elements is oriented in such a way that a plane that is normal to a crystal lattice plane is oriented essentially 45° with respect to a plane that is normal to the substrate from which the spring is fabricated.

18. The rotation rate sensor as claimed in claim 1, wherein at least one of the suspension spring elements is embodied in such a way that an absolute value of a second order nonlinearity coefficient ($\beta$) of a spring stiffness with respect to a deflection that is substantially in a direction of the bar sections of the at least one suspension spring element is less than 2,000,000 (units of meters$^{-2}$).

19. The rotation rate sensor as claimed in claim 1, wherein at least one of the suspension spring elements is embodied in such a way that an absolute value of a second order nonlinearity coefficient ($\beta$) of a spring stiffness with respect to a deflection that is substantially in a direction of the bar sections of the at least one suspension spring element is less than 300,000 (units of meters$^{-2}$).

20. The rotation rate sensor as claimed in claim 1, wherein at least one of the suspension spring elements has a force deflection behavior such that the suspension spring element compensates a nonlinear force deflection behavior of a seismic mass in a driving direction that is caused by an undesired force deflection behavior of one or more other suspension spring elements, and the seismic mass has a substantially linear force deflection behavior in the driving direction, and the at least one suspension spring element has a force deflection behavior that is set in a defined fashion.

21. The rotation speed sensor as claimed in claim 1,
wherein the rotation speed sensor is configured to sense a rotation rate about an x-axis,
wherein the seismic masses are driven in a y-direction,
wherein the seismic masses are suspended from suspension spring elements, at least one of which is of rigid design in an x-direction in each case,
wherein the coupling bar is suspended from the substrate by a torsion spring which permits torsion about the x-axis and is rigid in the x and z-directions, and said coupling bar is coupled at each of its two ends to the seismic masses by spring elements.

22. The rotation rate sensor as claimed in claim 1,
wherein the rotation speed sensor is configured to sense a rotation rate about an x-axis and a z-axis,
wherein the seismic masses are driven in a y-direction,
wherein the coupling bar is suspended from the substrate by a torsion spring which permits torsion about the x-axis and the z-axis and is rigid in an x-direction and z-direction.

23. The rotation rate sensor as claimed in claim 1, wherein the rotation rate sensor is embodied as a micro-electro-mechanical system (MEMS) or MEMS module which has mechanical and electronic means for connecting to and/or interacting with further MEMS modules and/or with at least one electronic signal processing circuit.

24. A method for manufacturing a rotation rate sensor comprising the step of forming micromechanical elements by a manufacturing process for manufacturing micromechanical systems from a substrate which is composed from crystalline silicon or a plurality of layers of semiconductor material and/or metal or metals, wherein the rotation rate sensor is embodied as claimed in claim 1.

\* \* \* \* \*